United States Patent [19]
Korczynski, Jr. et al.

[11] Patent Number: 5,911,405
[45] Date of Patent: Jun. 15, 1999

[54] MULTI-PORTED DIVERTER VALVE ASSEMBLY

[75] Inventors: Joseph F. Korczynski, Jr., Glen Burnie; Patrick D. Conroy, Bowie, both of Md.

[73] Assignee: The United States of America as represented by the Secretary of the Navy, Washington, D.C.

[21] Appl. No.: 08/854,033

[22] Filed: May 9, 1997

[51] Int. Cl.[6] ........................................ F16K 5/06
[52] U.S. Cl. ................... 251/315.05; 251/315.11
[58] Field of Search .................. 251/315.05, 315.11, 251/315.12

[56] References Cited

U.S. PATENT DOCUMENTS

| 3,041,036 | 6/1962 | McFarland, Jr. | 251/315.11 X |
| 3,211,420 | 10/1965 | Hartmann | 251/315.11 X |
| 3,949,965 | 4/1976 | Sharples et al. | 251/315.05 X |

*Primary Examiner*—John Fox
*Attorney, Agent, or Firm*—John Forrest; Jacob Shuster

[57] ABSTRACT

The metallic housing of a diverter valve assembly has a plurality of threadedly positioned inserts therein through which different port passage paths are established with a multi-ported ball valve element angularly displaceable inside the housing while sealingly enclosed within a tube through which the inserts project into adjusted seating engagement with the ball valve element.

7 Claims, 3 Drawing Sheets

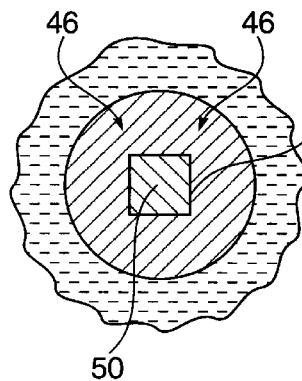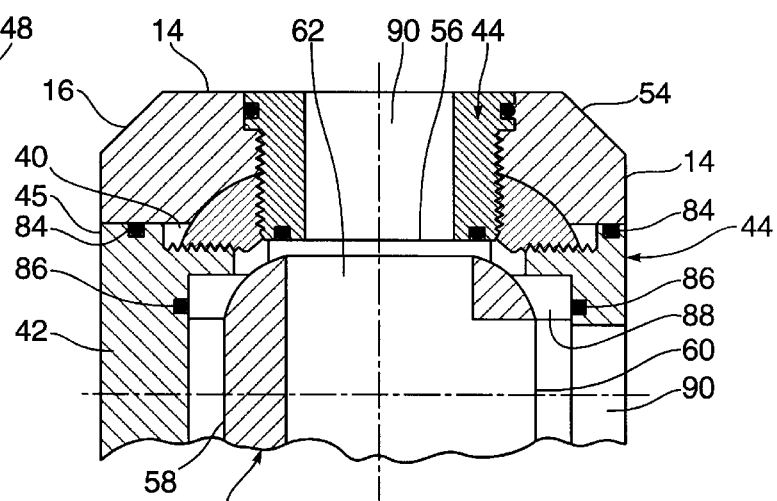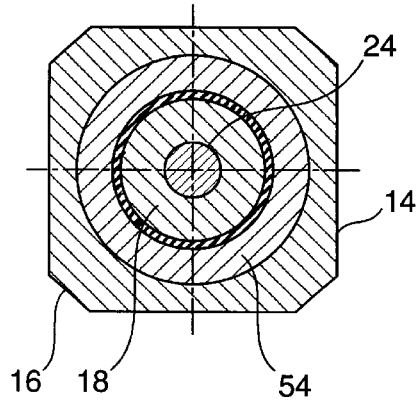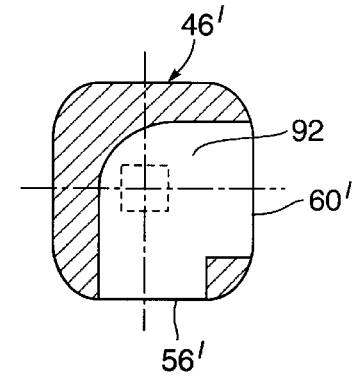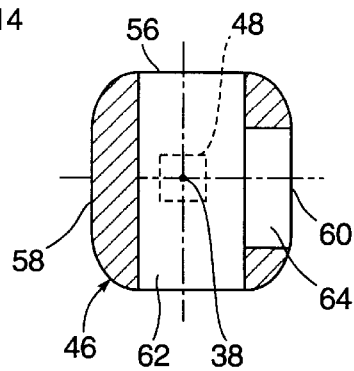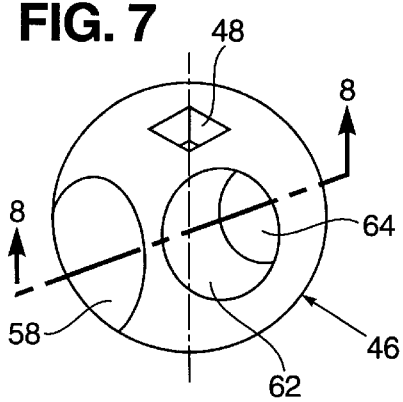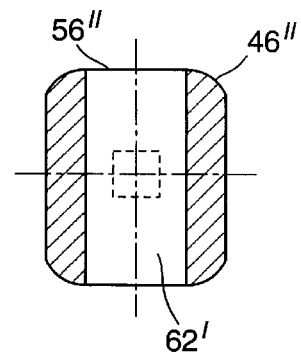

MULTI-PORTED DIVERTER VALVE ASSEMBLY

The present invention relates to the construction and arrangement of a selectively controlled valve assembly through which fluent matter such as corrosive fluids and solid waste slurries is conducted.

BACKGROUND OF THE INVENTION

Diverter valves through which corrosive fluent materials are conducted have been traditionally constructed with components made of cast bronze or other expensive corrosion resistant metal alloys, and also incorporate components made of fiber-reinforced thermoplastics such as Teflon to provide sealing surfaces. Such valves have nevertheless exhibited numerous operational problems such as poor fire performance due to melting of valve seats, as well as scaling and galvanic corrosion, and melting of protective coatings due to thermal conductivity of a metallic valve housing. It is therefore an important object of the present invention to provide a diverter valve assembly of the foregoing type which is capable of more effectively handling corrosive fluids and solid waste slurries while safely reacting to conduit shock loads typically experienced in marine vessel installations.

SUMMARY OF THE INVENTION

In accordance with the present invention, a ball shaped flow controlling element of a diverter valve assembly is angularly displaced about the axis of a valve actuating shaft extending through a closure end plate into a metallic valve housing within which a tube is positioned to enclose the ball shaped element and cavities on opposite sides thereof. Such cavities are minimized in size by being occupied with thermoplastic fillers. One axial end portion of the tube is sealed by O-rings to the housing and by a gasket to the end plate through which the valve actuating shaft extends into one of the cavities for torsional coupling to the ball element. The other axial end portion of the tube and the housing are also sealed by an O-ring and gasket on the other closure end plate to prevent leakage during flow of various fluent materials through the ball element, including seawater, sewage and oily waste fluids. The foregoing components of the valve assembly exposed to fluent material within the housing are made of corrosion resistant material such as a thermosetting resin composite that is fiber reinforced so as to withstand shock loading.

Inserts having flange portions seated within openings in the housing, threadedly project by an adjusted amount through the tube into seated engagement with the ball element. Spring-like pressure so exerted on the ball element is adjustable during threaded installation of the inserts so as to optimize sealing and operational torque applied to the ball element through the valve actuating shaft for angular displacement thereof between flow blocking and flow directing positions. At least one of the inserts may be of a flow blocking plug type for certain installations while the other inserts are provided with flow through port passages. O-ring seals carried by the inserts engage the housing and the ball element to prevent leakage.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein:

FIG. 4 is a partial section view taken substantially through a plane indicated by section line 4—4 in FIG. 3;

FIG. 5 is an enlarged partial section view taken substantially through a plane indicated by section line 5—5 in FIG. 3;

FIG. 6 is a section view taken substantially through a plane indicated by section line 6—6 in FIG. 3;

FIG. 7 is a perspective view of the ball valve element associated with the valve assembly illustrated in FIGS. 1–6;

FIG. 8 is a section view of the ball valve element taken substantially through a plane indicated by section line 8—8 in FIG. 7; and FIGS. 8A and 8B are section views similar to that of FIG. 8, respectively illustrating different embodiments of a ball valve element capable of being utilized in the valve assembly of FIGS. 1–8 in place of the ball valve element shown in FIGS. 7 and 8.

DETAILED DESCRIPTION OF PREFERRED EMBODIMENTS

Figure 1:
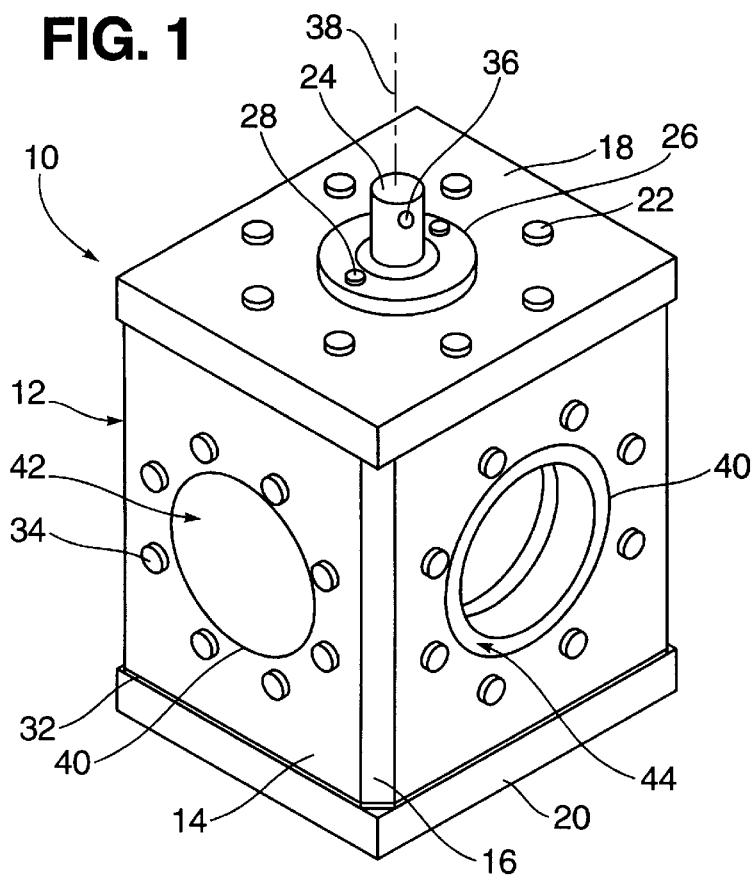
FIG. 1 is a perspective view of a valve assembly constructed in accordance with one embodiment of the present invention.
Figure 2:
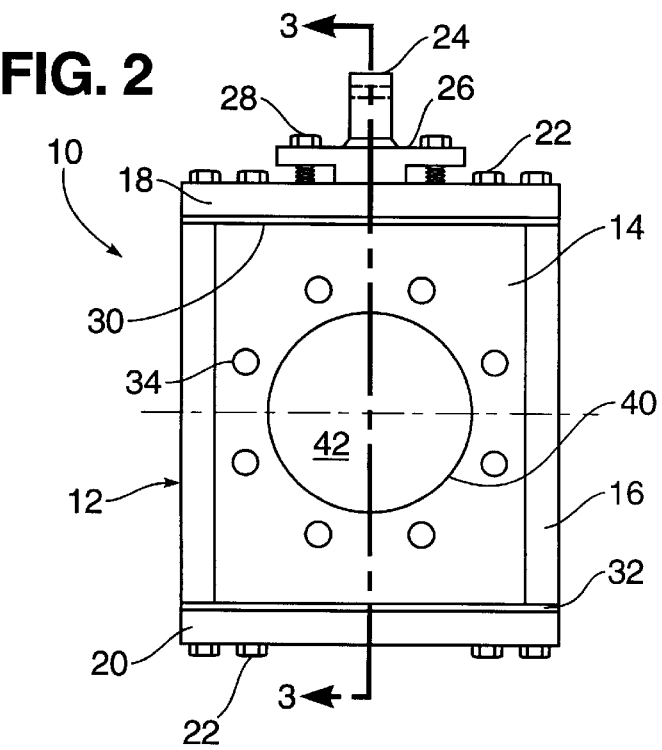
FIG. 2 is a front elevational view of the valve assembly shown in FIG. 1.

Referring now to the drawing in detail, FIGS. 1 and 2 illustrate a diverter valve assembly generally referred to by reference numeral 10, constructed in accordance with one embodiment of the present invention. The valve assembly 10 embodies a generally cubic shaped framework housing 12 having four generally square-faced side walls 14 interconnected at right angles to each other by bevel corner sections 16. Such side walls 14 extend between top and bottom rectangular closure end plates 18 and 20 secured to the housing end walls by a plurality of screw fasteners 22. A valve actuating stem or shaft 24 extends into the housing 12 through the top end plate 18 and a circular gland plate element 26 secured to the housing by a pair of screws fasteners 28. The end plates 18 and 20 are respectively spaced from direct contact with the top and bottom ends of the side walls 14 by face gaskets 30 and 32 to seal the interior of the housing 12.

The foregoing described framework housing 12 is typically made of cast bronze or copper-alloy metal. The side walls 14 of such housing 12 are furthermore provided with drilled holes 34 for attachment thereto of flow conduits or pipes having flanges with fasteners that mate with the holes 34. The valve actuating shaft 24 extending from the top end of the housing 12 has a shear-pin hole 36 formed therein so that it may be attached to a suitable handle through which valve displacing motion about an axis 38 may be imparted thereto.

With continued reference to FIG. 1, each of the four side walls 14 of the framework housing 12 is provided with a circular opening 40 adapted to receive one of two types of inserts 42 and 44. Such inserts as well as the top and bottom end plates 18 and 20 are made of a fiber-reinforced, thermosetting resin composite material. The insert 42 is of a solid plug type while the insert 44 has a full-through bore to form a flow port passage. By selection of the type of insert utilized for each side wall 14, the valve assembly 10 may be configured for different multi-port valve operations in response to angular displacement of the valve actuating shaft 24, including 2-way or 3-way operation, or 4-way operation in which case no solid plug type insert 42 is utilized.

Referring now to FIGS. 3, 4, 5 and 8 in particular, a multi-port type of flow controlling component in the form of a ball shaped element 46 made of a fiber-reinforced thermosetting resin composite material is shown positioned within the housing 12 for angular displacement by the valve actuating shaft 24 about its rotational axis 38. The ball element 46 has a cross-sectionally square recess 48 formed therein for reception of a torsion transmitting coupling 50 extending axially from a flange portion 52 at the lower end of the valve actuating shaft 24 within the housing 12. The ball element 46 is furthermore disposed in spaced relation to both the top and bottom end plates 18 and 20 within a thick-walled cylindrical tube 54 also made of fiber-reinforced thermosetting resin composite material. Such tube 54 extends in coaxial spaced relation to the stem 24 to enclose the ball valve element 46 between the end plates 18 and 20. Such ball element 46 is provided with a pair of parallel spaced planar faces 56, at right angles to another pair of parallel spaced planar faces 58 and 60. As more clearly seen in FIGS. 7 and 8, a flow passage 62 extends completely through the ball element 46 between the parallel spaced valve faces 56 in communication with a flow passage 64 at right angles thereto extending from the valve face 60. In the embodiment illustrated in FIGS. 1–8, no flow passage extends from the valve face 58 so as to block flow through those side walls 14 within which the inserts 42 are positioned.

Figure 3:
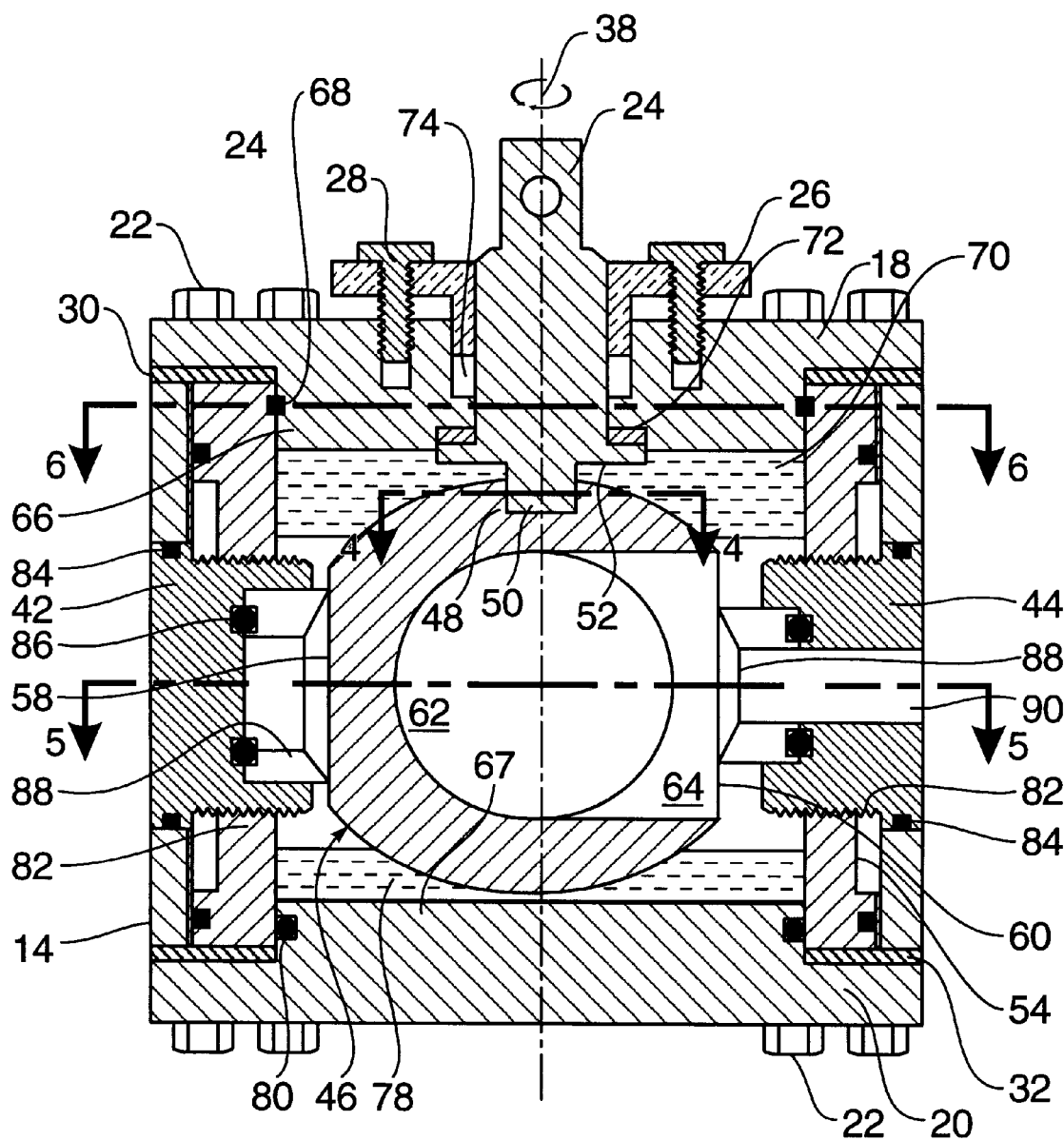
FIG. 3 is a side section view taken substantially through a plane indicated by section line 3—3 in FIG. 2.

As shown in FIGS. 2 and 3, the face gasket 30 underlies the top end plate 18, secured to the upper ends of the side walls 14 by the fasteners 22. Such gasket 30 is in surrounding relation to a central axially projecting portion 66 of the top end plate 18 to form an annular receiving formation for the end walls 14 and tube 54 in contact with the face gasket 30. Also, there is an O-ring seal 68 embedded in the projecting portion 66 of the top end plate 18 spaced from the ball element 46 to seal a cavity occupied by a filler 70 made of a thermoplastic such as Teflon. The filler 70 has an opening through which projection 50 extends from flanger 52 on the lower end of shaft 24 on which a thrust washer 72 is received to seat the flange 52 within an annular recess in the projecting portion 66 of the top end plate 18. The valve actuating shaft 24 is also protectively enclosed within the axial bore formed in the top end plate 18 in close spaced relation to the thrust washer 72, by a Teflon padding gland 74 in axial abutment with an axially extending portion of the gland plate 26 made of a corrosion resistant metal. A cavity is also enclosed at the lower end of the valve assembly occupied by a thermoplastic filler 78 between the ball element 46 and a central axially projecting portion 67 of the bottom end plate 20 forming an annular space on the end plate receiving the end walls 14 and the tube 54 seated on an annular gasket 32. An O-ring seal 80 is embedded in the projecting portion 67 of the bottom end plate 20 for engagement with the tube 54 to seal the cavity occupied by the filler 78.

The tube 54 is formed with four internally threaded openings 82 intermediate its opposite axial ends in respective alignment with the openings 40 in the side walls 14 of the housing so as to threadedly receive the inserts 42 and 44 therein by an adjusted amount during assembly and/or installation. Such inserts embed annular O-ring seals 84 on flange portions 45 for contact with the side walls 14 within the openings 40 therein as shown in FIGS. 3 and 5 so as to prevent leakage from the tube 54. Each valve seat 88 on the ball element 46 embeds an O-ring seal 86 on its back face in contact with an inert 42 or 44, which spring loads the seat 88 against the ball element 46 so as to aid in providing a positive seal therewith.

The foregoing described arrangement for the valve assembly 10 features certain interrelationships between the tube 54 and end plates 18 and 20 which improve valve performance through ball element 46 with enhanced maintenance free operation despite the corrosion and erosion effects of fluids and fluent materials being handled. In addition to accommodating the described ball element 46, wherein a T-bore arrangement of flow passages 62 and 64 opening at three of the four valve faces 56 and 60 as shown in FIG. 8 may be selectively aligned with port openings 40 in the housing side walls 44 through port passages 90 in the inserts 44 as shown in FIG. 5 by angular valve displacement about axis 38, FIGS. 8A and 8B illustrate by way of example other forms of ball type elements 46' and 46" which may be accommodated within the diverter valve assembly 10 as replacements for the ball element 46 hereinbefore described. As shown in FIG. 8A, a ball element 46' has an internal L-bore flow passage 92 extending between openings formed in only two of the planar valve faces 56' and 60' at right angles to each other. As shown in FIG. 8B, a single straight-bore flow passage 62' is formed in the ball element 46" extending between openings formed on only two of the planar valve faces 56" parallel to each other.

Obviously, other modifications and variations of the present invention may be possible in light of the foregoing teachings. It is therefore to be understood that within the scope of the appended claims the invention may be practiced otherwise than as specifically described.

What is claimed:

1. In combination with a valve assembly for selectively directing passage of fluent material through a valve housing by angular displacement therein of a flow controller element, the improvement residing in: a tube enclosing said element within the housing between cavities formed therein; sealing means engageable with said tube for preventing leakage from said element through said cavities; and port means adjustably inserted into the housing for projection through the tube into seated engagement with said element to conduct the fluent material along different flow paths therethrough in response to said angular displacement thereof relative to the housing, said sealing means including: closure means secured to the housing in operative sealing engagement with the tube; thermoplastic filler occupying said cavities enclosed within the tube; and O-ring seals carried by the tube adjacent opposite axial ends thereof in contact engagement with the housing and the closure means.

2. The combination as defined in claim 1 wherein said housing is made of metal and the tube is made of a corrosion-resistant resin composite.

3. The combination as defined in claim 1 wherein said port means includes: a plurality of inserts threadedly received within the tube and having flange portions fitted into openings formed within the housing, at least one of said inserts constituting a closure plug blocking flow through one of the openings in the housing.

4. The combination as defined in claim 3 wherein at least one of said inserts constitutes a closure plug blocking flow through one of the openings in the housing while the other of the inserts are provided with port passages extending therethrough.

5. The combination as defined in claim 4 wherein said fluent material includes corrosion inducing waste slurries.

6. The improvement as defined in claim 1 wherein said port means includes: a plurality of inserts threadedly received within the tube and having flange portions fitted into openings formed within the housing, said inserts being provided with port passages extending therethrough.

7. In combination with a valve assembly for selectively directing passage of fluent material through a valve housing by angular displacement therein of a flow controlling element, the improvement residing in: a tube enclosing said element within the housing between cavities formed therein; sealing means engageable with said tube for preventing leakage from said element through said cavities; and port means adjustable inserted into the housing for projection through the tube into seated engagement with said element to conduct the fluent material along different flow paths therethrough in response to said angular displacement thereof relative to the housing, said port means including: a plurality of inserts threadedly received within the tube and having flange portions fitted into openings formed within the housing, said inserts being provided with port passages extending therethrough.

* * * * *